United States Patent
Larus

(10) Patent No.: US 7,406,407 B2
(45) Date of Patent: Jul. 29, 2008

(54) VIRTUAL MACHINE FOR OPERATING N-CORE APPLICATION ON M-CORE PROCESSOR

(75) Inventor: James R. Larus, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 118 days.

(21) Appl. No.: 11/445,980

(22) Filed: Jun. 1, 2006

(65) Prior Publication Data

US 2007/0282572 A1 Dec. 6, 2007

(51) Int. Cl.
*G06F 9/455* (2006.01)
(52) U.S. Cl. .......................... 703/27; 709/201; 718/100
(58) Field of Classification Search .................. 703/13, 703/20, 23, 26–28; 709/201, 226; 718/100
See application file for complete search history.

(56) References Cited

U.S. PATENT DOCUMENTS

2004/0111715 A1  6/2004  Stone
2005/0132363 A1  6/2005  Tewari et al.
2006/0090161 A1  4/2006  Bodas et al.
2007/0233775 A1*  10/2007  Jackson et al. .............. 709/201

FOREIGN PATENT DOCUMENTS

JP       2006/302270       11/2006

OTHER PUBLICATIONS

Zhou, Dual-Core Execution: Building a Highly Scalable Single-Thread Instruction Window, IEEE 14th Int. Conf. on Parallel Architectures and Compilation Techniques, Sep. 2005, pp. 231-242.*

* cited by examiner

*Primary Examiner*—Russell Frejd
(74) *Attorney, Agent, or Firm*—Woodcock Washburn LLP

(57) ABSTRACT

A virtual machine is instantiated on an M-core processor, and an N-core application is instantiated on the virtual machine such that the virtual machine emulates an N-core processor to the N-core application. Thus, the virtual machine hides difference between the N cores expected by the application and the M cores available from the processor.

16 Claims, 7 Drawing Sheets

VIRTUAL MACHINE FOR OPERATING N-CORE APPLICATION ON M-CORE PROCESSOR

TECHNICAL FIELD

In the other circumstance where M is greater than N such that the M-core processor has more cores than the N-core application is constructed to employ, at least some of the M cores of the processor are not employed even though possibly available. For example, if the application is a 4-core application expecting 4 cores and the processor in fact has 8 cores, the work that was originally divided by the application into 4 portions for processing by 4 cores could have been even further divided into 8 portions, but instead is only performed by 4 of the cores of the 8-core processor, with the other 4 cores being idle at least with regard to the application. As may be appreciated, such idle cores represent wasted capacity and by extension a wasted opportunity to operate the application faster and/or more efficiently.

BACKGROUND OF THE INVENTION

As may be appreciated, a multi-core processor is designed based on a multi-core processor architecture to include two or more processor-based computational engines or 'cores' within a single computing device. Typically, although not necessarily, such a multi-core processor is mounted to a computing device in a single processor socket, but the operating system operating on the computing device perceives each executing core of the multi-core processor as a discrete logical processor, with all associated execution resources.

Generally, a multi-core processor and the architecture thereof are intended to implement a strategy of increasing performance by dividing work performed by a typical single-core processor into discrete portions and executing each portion at a particular core, thereby performing more work within a given processor clock cycle. To enable the full use of a multi-core processor, then, a particular application running on the processor must be constructed to assign application work portions or 'threads' across the available cores.

Notably, a multi-core processor can execute completely separate threads of code from one application or from multiple applications, all in parallel. For example, such a multi-core processor with two cores can execute a thread from an application on a first core and a thread from an operating system on a second core in parallel, or parallel threads on the first and second cores from the application. Similarly, with higher numbers of cores, such a multi-core processor can execute a multitude of variations of threads from multiple applications and operating systems, all in parallel. As should now be appreciated, with such parallel processing over multiple cores, a multi-core processor offers true parallel multi-tasking on a computing device, as opposed to sequential pseudo-multitasking. Such true parallel multitasking may for example include a home user editing a picture while recording a video feed, or an office user copying data from a server while running an environmental monitoring application.

With true parallel multitasking, a multi-core processor can be employed to improve responsiveness in any computing device environment where a user is actively working in two or more applications, or when background applications compete with each other and with user applications for processing time. Thus, multiple processor-intensive tasks may be performed on a computing device with less issues such as freezing, excessive time lags, unprompted halts, irregular performance, audio and/or video distortion, and the like.

Note, however, that an issue arises in the situation where a particular application is constructed to employ one number N of cores of a multi-core processor on a computing device, and such multi-core processor in fact has another number M of cores. In the one circumstance where N is greater than M such that the M-core processor has less cores than the N-core application is constructed to employ, the work of the N-core application most likely must be assigned to the cores of the M-core processor in a manner not originally intended. For example, if the application is a 4-core application expecting 4 cores and the processor in fact has 2 cores, the work that was originally divided by the application into 4 portions for processing by 4 cores must somehow now be assigned to the 2 available cores by the operating system of the computing device or the like, perhaps by doubling up such portions. As may be appreciated, such re-assigning is likely performed by the operating system or the like on an ad hoc basis and without any knowledge of a preferred method to be employed, if indeed such a method exists. Accordingly, such re-assigning likely results in inefficiencies and could under some circumstances even cause errors or even fatal errors.

In the other circumstance where M is greater than N such that the M-core processor has more cores than the N-core application is constructed to employ, the M-core processor at least some of the M cores of the processor are not employed even though possibly available. For example, if the application is a 4-core application expecting 4 cores and the processor in fact has 8 cores, the work that was originally divided by the application into 4 portions for processing by 4 cores could have been even further divided into 8 portions, but instead is only performed by 4 of the cores of the 8-core processor, with the other 4 cores being idle at least with regard to the application. As may be appreciated, such idle cores represent wasted capacity and by extension a wasted opportunity to operate the application faster and/or more efficiently.

Accordingly, a need exists for a system whereby an N-core application constructed to operate on an N-core processor is in fact operated efficiently on an M-core processor, where M is greater than or less than N. In particular, a need exists for such a system where the N-core application is operated as if on an N-core processor even though in fact on an M-core processor. More particularly, a need exists for such a system where the N-core application is operated on a virtual machine that emulates an N-core processor, and that re-assigns the work of the application to the M-core processor in an efficient manner.

SUMMARY OF THE INVENTION

The aforementioned need is satisfied by the present invention in which a computing device has a multi-core processor, a multi-core application, and a virtual machine. The multi-core processor has a particular number M of executing cores, where each core is a discrete logical processing entity capable of individually being assigned work, and the multi-core application is instantiated on the computing device and expects a particular number N of executing cores to be present on the M-core processor such that the N-core application assigns a particular number N of application work portions. The virtual machine is instantiated on the M-core processor, and the N-core application is instantiated on the virtual machine such that the virtual machine emulates an N-core processor to the N-core application. Thus, the virtual machine hides differences between the N cores expected by the application and the M cores available from the processor.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
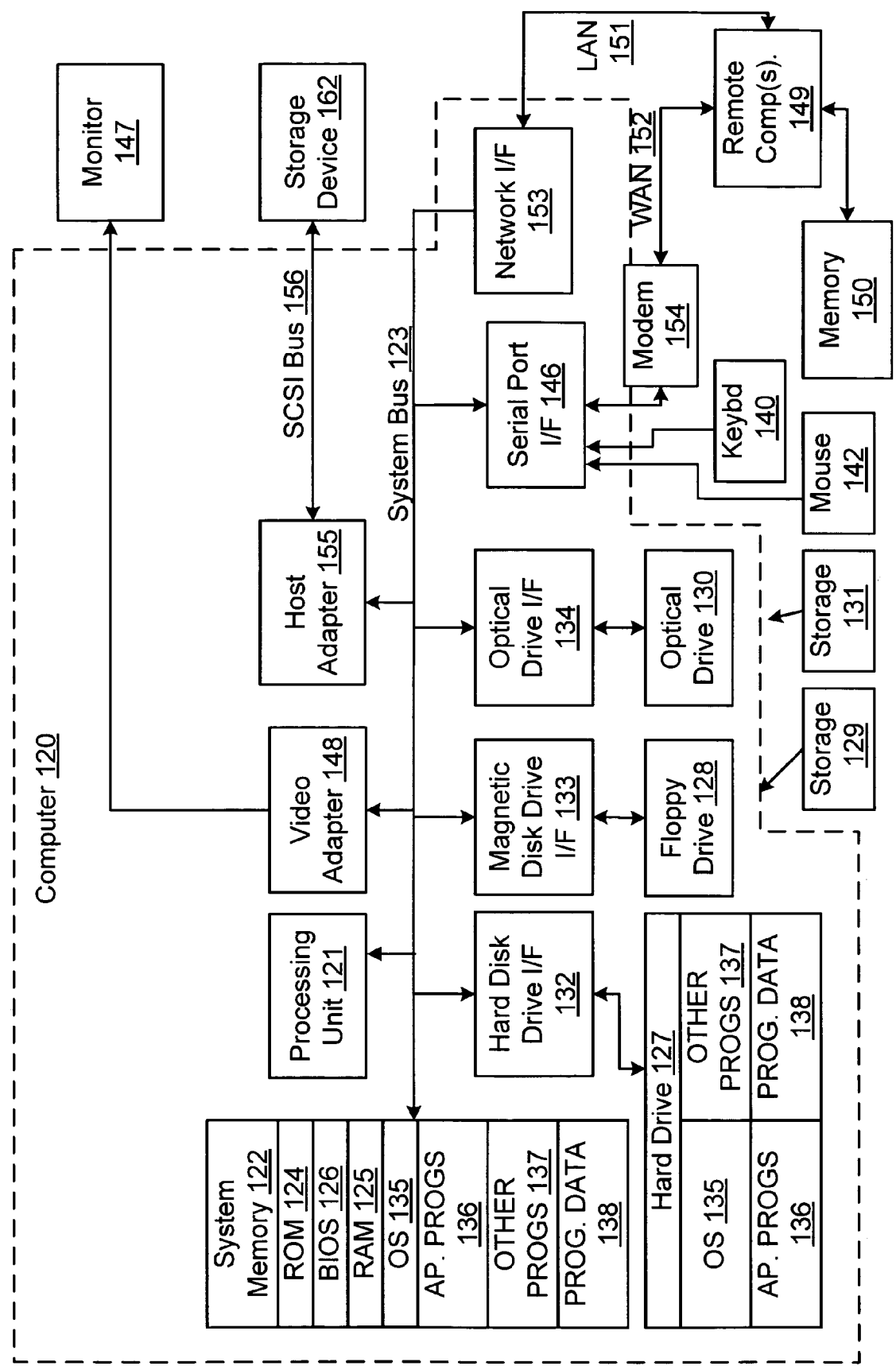
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Multi-core Processor

Figure 2:
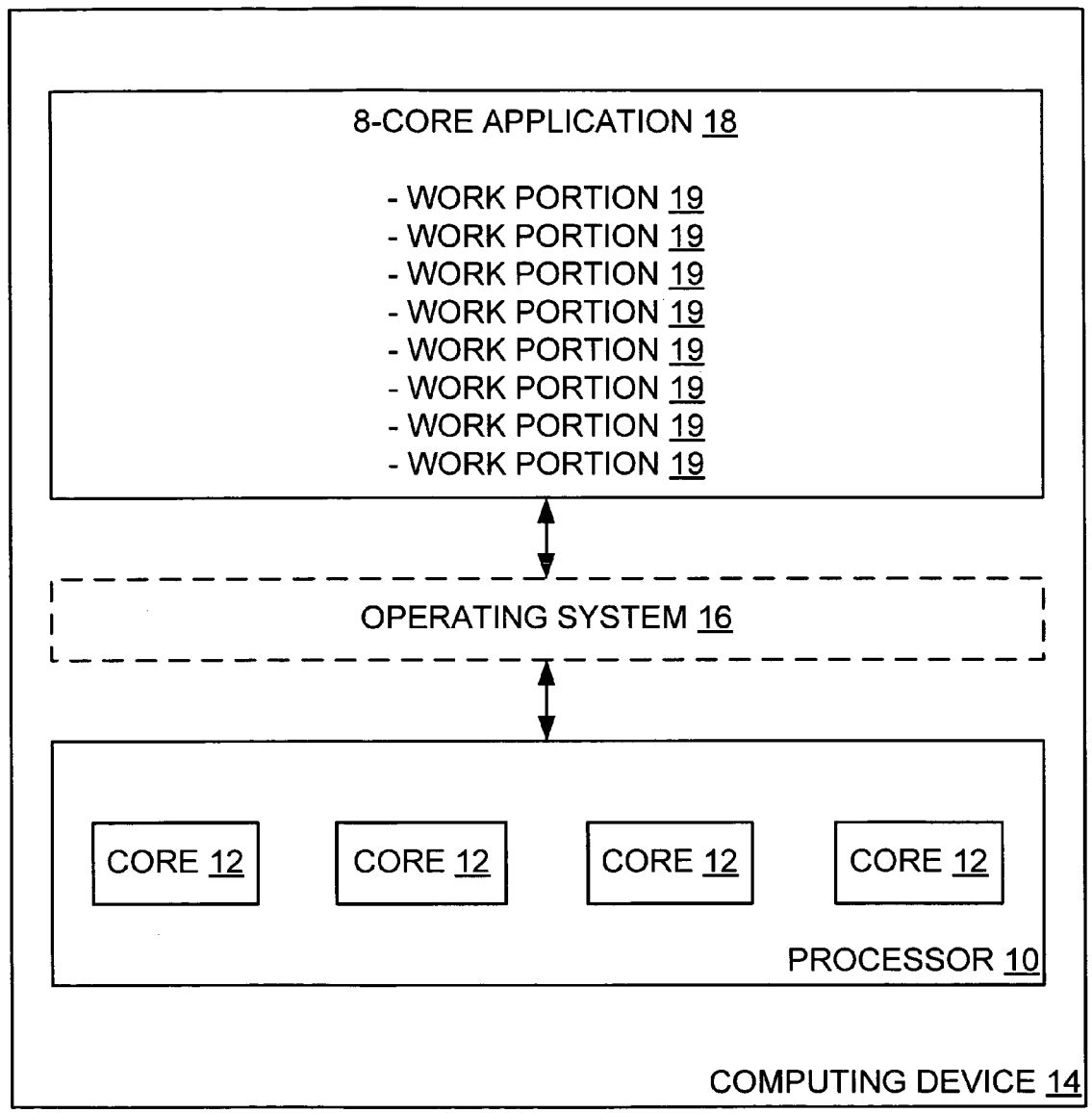
FIGS. 2 and 3 are block diagrams showing an 8-core application (FIG. 2) and a 2-core application (FIG. 3) operating on a computing device having a 4-core processor
Figure 3:
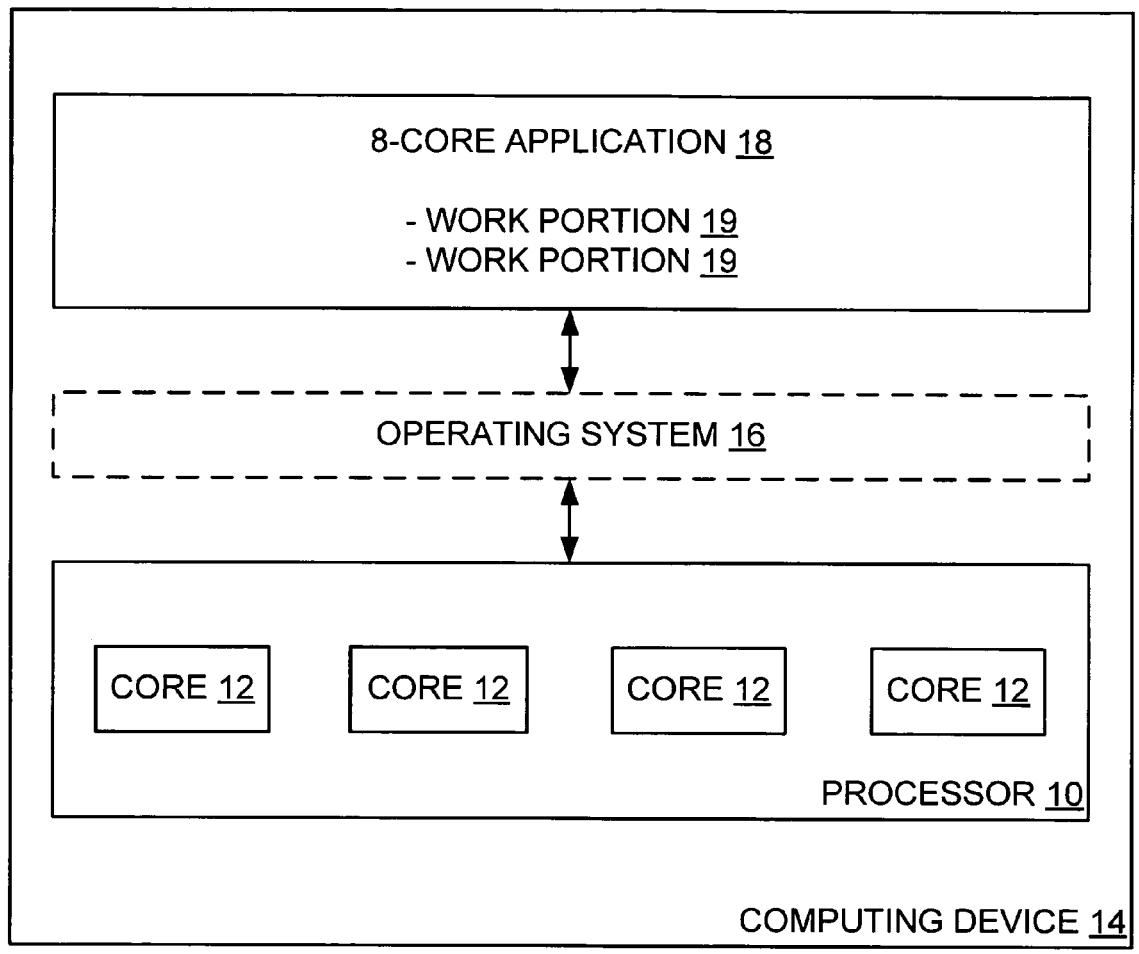

As was set forth above, the present invention is performed with regard to a multi-core processor 10 such as that shown in FIGS. 2 and 3. The multi-core processor 10 is designed based on a multi-core processor architecture to include two or more processor-based computational engines or 'cores' 12 within the single processor 10. As seen, the processor 10 of FIGS. 2 and 3 includes 4 cores 12, although any number of cores 12 may be employed in the processor 10 without departing from the spirit and scope of the present invention. The processor 10 with the multiple cores 12 is mounted to a computing device 14 in a single processor socket or the like, but the operating system 16 of the computing device 14 perceives each executing core 12 of the processor 10 as a discrete logical processor capable of individually being assigned work and having access to all associated execution resources. Such a multi-core processor 10, computing device 14, and operating system 16 are known or should be apparent to the relevant public and therefore need not be set forth herein in any detail other than that which is provided. Accordingly, such multi-core processor 10, computing device 14, and operating system 16 may be any appropriate multi-core processor, computing device, and operating system without departing from the spirit and scope of the present invention.

It is to be presumed that the multi-core processor 10 on any particular computing device 14 can have a diverse number of cores 12, and also that differing cores 12 on any particular processor 10 may provide diverse functionality or even employ diverse instruction sets. Accordingly, and as may be appreciated, developing a multi-core application 18 that can handle such diversity is difficult. For one example, it is oftentimes difficult to write a multi-core application 18 that can handle a varying number of cores 12 in a processor 10, since the partitioning of data and computation among such cores 12 may be closely tied to the number of independent threads of control. For another example, it is oftentimes difficult to write a compiler for machines that have different functional units, since the compiler will adopt different optimization strategies and code generation techniques for each such different functional unit.

As seen in FIGS. 2 and 3, a particular application 18 is instantiated in or by the operating system 16 on the computing device 14, and has been constructed to assign a particular number of application work portions 19 across an expected number of cores 12 of the processor 10. For example, as seen in FIG. 2, the application 18 is an 8-core application 18 that expects to assign application work portions 19 across 8 cores 12 of the processor 10. Likewise, and as seen in FIG. 3, the application 18 is a 2-core application 18 that expects to assign application work portions 19 across 2 cores 12 of the processor 10. Such a multi-core application 18 as shown in FIGS. 2 and 3 is known or should be apparent to the relevant public and therefore need not be set forth herein in any detail other than that which is provided. Accordingly, such multi-core application 18 may be any appropriate multi-core application without departing from the spirit and scope of the present invention.

As should be appreciated, each work portion 19 as assigned by the application 10 of FIG. 2 or FIG. 3 may be defined on any appropriate basis without departing from the spirit and scope of the present invention. For example, each work portion 19 may comprise one or more threads or the like, and may be selected to require roughly the same amount of processing capacity or 'bandwidth'. With such work portions 19, and as should also be appreciated, the multi-core processor 10 increases performance by executing each portion at a particular core, thereby performing more work within a given processor clock cycle.

As seen in FIG. 2, inasmuch as the application 18 is expecting 8 cores 12 to be available from the processor 10 shown but such processor 10 in fact has 4 cores 12, the application 18 is generating 8 work portions 19 for the operating system 16 to process. Accordingly, the operating system 16 must somehow channel the 8 work portions 19 to the 4 cores 12 of the processor 10. For example, and as shown, the operating system 16 may simply choose to re-assign two work portions 19 to each core 12. As was set forth above, such re-assigning is likely performed by the operating system 16 on an ad hoc basis and without any assistance from the application 18 or knowledge of a preferred method to be employed, if indeed such a method exists. Accordingly, such re-assigning may result in an inefficiency, for example if a first core 12 ultimately is assigned work that requires a relatively larger amount of bandwidth and a second core 12 ultimately is assigned work that requires a relatively smaller amount of bandwidth, and the application must continually wait for the first core 12. Similarly, such re-assigning could under some circumstances even cause errors or even fatal errors, such as for example if in waiting the application 18 somehow misses crucial data from some source.

As seen in FIG. 3, and in contrast to FIG. 2, inasmuch as the application 18 is expecting 2 cores 12 to be available from the processor 10 shown but such processor 10 in fact has 4 cores 12, the application 18 is generating 2 work portions 19 for the operating system 16 to process. Accordingly, the operating system 16 likely channels the 2 work portions 19 to 2 of the 4 cores 12 of the processor 10. As a result, the other 2 cores 12 are idle, at least with regard to the application. As may be appreciated, such idle cores 12 represent wasted capacity and by extension a wasted opportunity to operate the application 18 faster and/or more efficiently.

In general, then, when the application 18 is constructed to employ one number N of cores 12 of the processor 10 on the computing device 14, and such processor 10 in fact has another number M of cores 12, inefficiencies and/or other problems can arise. Thus, the present invention addresses such inefficiencies and/or other problems by interposing a virtual machine 20 between the application 18 and the processor 10, as is shown in FIG. 4, to in effect emulate an N-core processor 10 to the N-core application 18.

Virtual Machine 20

Figure 4:
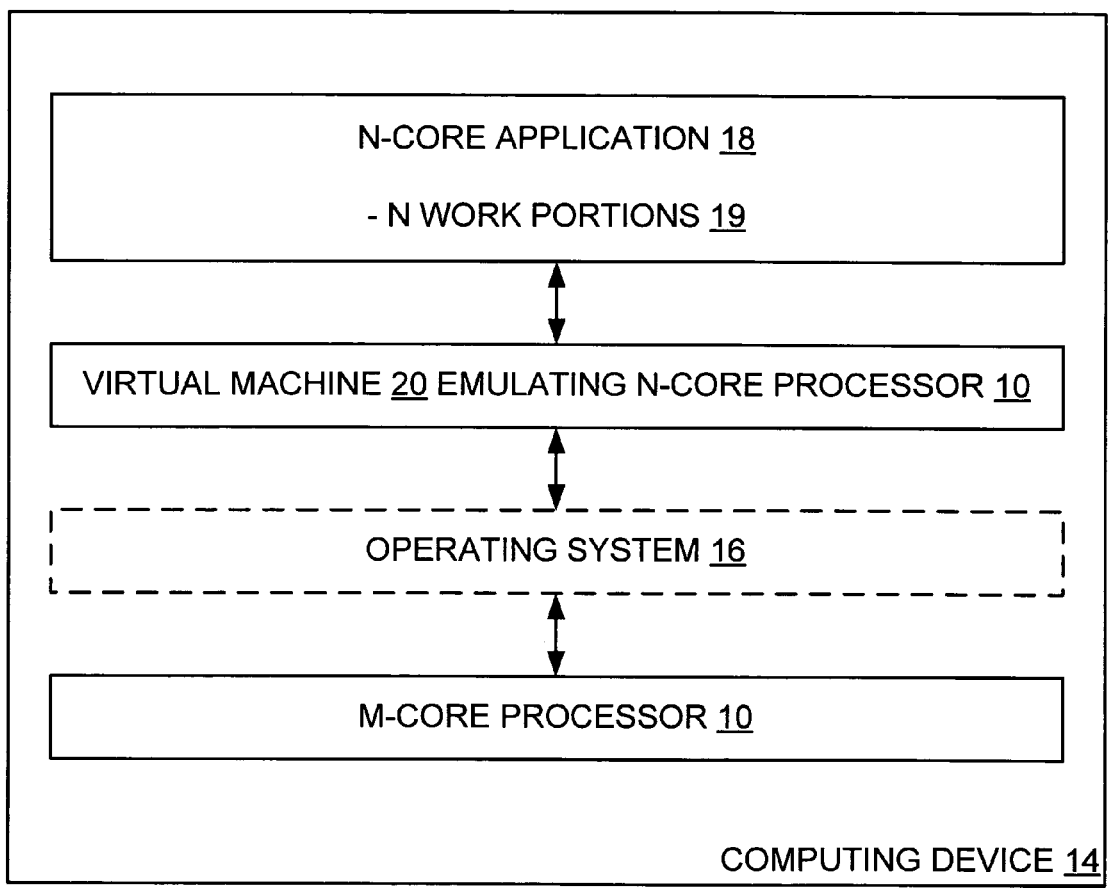
FIG. 4 is a block diagram showing an N-core application operating on a computing device having a M-core processor by way of a virtual machine emulating an N-core application in accordance with one embodiment of the present invention.

As should be appreciated, a virtual machine such as the virtual machine 20 of FIG. 4 is a software construct or the like that operates on the computing device 14 for the purpose of emulating a hardware system. In particular, in the present invention, the virtual machine 20 emulates an N-core processor 10 to the N-core application 18. Typically, although not necessarily, the virtual machine 20 is itself an application or the like and is employed on the computing device 14 to host the N-core application 18. As should be understood, such virtual machine 20 may represent a partitioning of the computing device 14, and as such may isolate the application 18 from other applications on such computing device.

Note here that the virtual machine 20 may be constructed to emulate a processor 10 having a particular number of cores 12, or may be constructed to emulate a processor 10 having any required number of cores 12. In the former case, the 8-core application 18 of FIG. 2 would require a first virtual machine 20 that emulates an 8-core processor 10 while the 2-core application 18 of FIG. 3 would require a second virtual machine 20 that emulates a 2-core processor 10. In the latter case, the same virtual machine could emulate an 8-core processor 10 for the 8-core application 18 of FIG. 2 and also could emulate a 2-core processor 10 for the 2-core application 18 of FIG. 3.

Constructing a virtual machine 20 and instantiating same on a computing device 14 having a processor 10 with M cores 12 is generally known or should be apparent to the relevant public and therefore need not be set forth herein in any great detail other than that which is provided. Accordingly, any appropriate virtual machine 20 may be employed to emulate a processor 10 having a particular number N of cores 12 for an N-core application 18 without departing from the spirit and scope of the present invention, presuming of course that the virtual machine 20 performs the functionality required of the present invention.

Note here that use of such virtual machine 20 may not be particularly efficient overall, especially in the case where the virtual machine 20 is emulating a number N cores 12 greater than the M cores 12 of the processor 10. However, such virtual machine 20 in emulating a particular number N of cores 12 for an N-core application 18 at least allows the application 18 to execute on the M-core processor 10 by in effect representing such N cores 12 to such N-core application. That is, the virtual machine 20 in emulating the N-cores 12 for the N-core application 18 in effect allows the application 18 to operate on the M core processor 10 when such application 18 otherwise would not do so.

The virtual machine 20 in effect operates to hide differences between the N cores 12 expected by an application 18 and the M cores 12 available from the processor 10. Thus, the virtual machine 20 provides a single, uniform abstraction of a machine that has a given number of processor cores 12 and a given collection of functional units, independent of what the underlying processor 10 actually provides. As a result, a developer can develop an N-core application 18 based on a single underlying framework that assumes an N-core processor 10, even if the processor 10 in fact has M cores 12.

Note that although the virtual machine 20 may be employed to operate the application 18 as efficiently as possible based on the M cores 12 of the processor 10, it may under some circumstances be more desirable to instead emphasize other operational aspects that in so doing sacrifice efficiency. For example, for a 2-core application 18 and a 4-core processor 10, it may be more efficient for the virtual machine to employ 2 cores 12 of the processor 10 for each core 12 as expected by the application 18. However, doing so may under some circumstances be unwieldy, perhaps if each work portion 19 of the application 18 cannot be divided between 2 cores 12 of the processor 10. In such a situation, then, the virtual machine may instead employ 1 core 12 of the processor 10 for each core 12 as expected by the application 18, even though doing so would result in 2 cores 12 of the processor 10 being left idle.

Using the virtual machine 20 as an intermediary between the application 18 and processor 10 can provide an ancillary yet significant advantage in at least some circumstances. For example, if the application 18 includes a pair of work portions 19 that communicate frequently and/or share a relatively large amount of data, such work portions 19 should advantageously share memory, buffers, or the like so that such communication or sharing involves one work portion 19 placing data in the shared space and the other retrieving the data.

Figure 5:
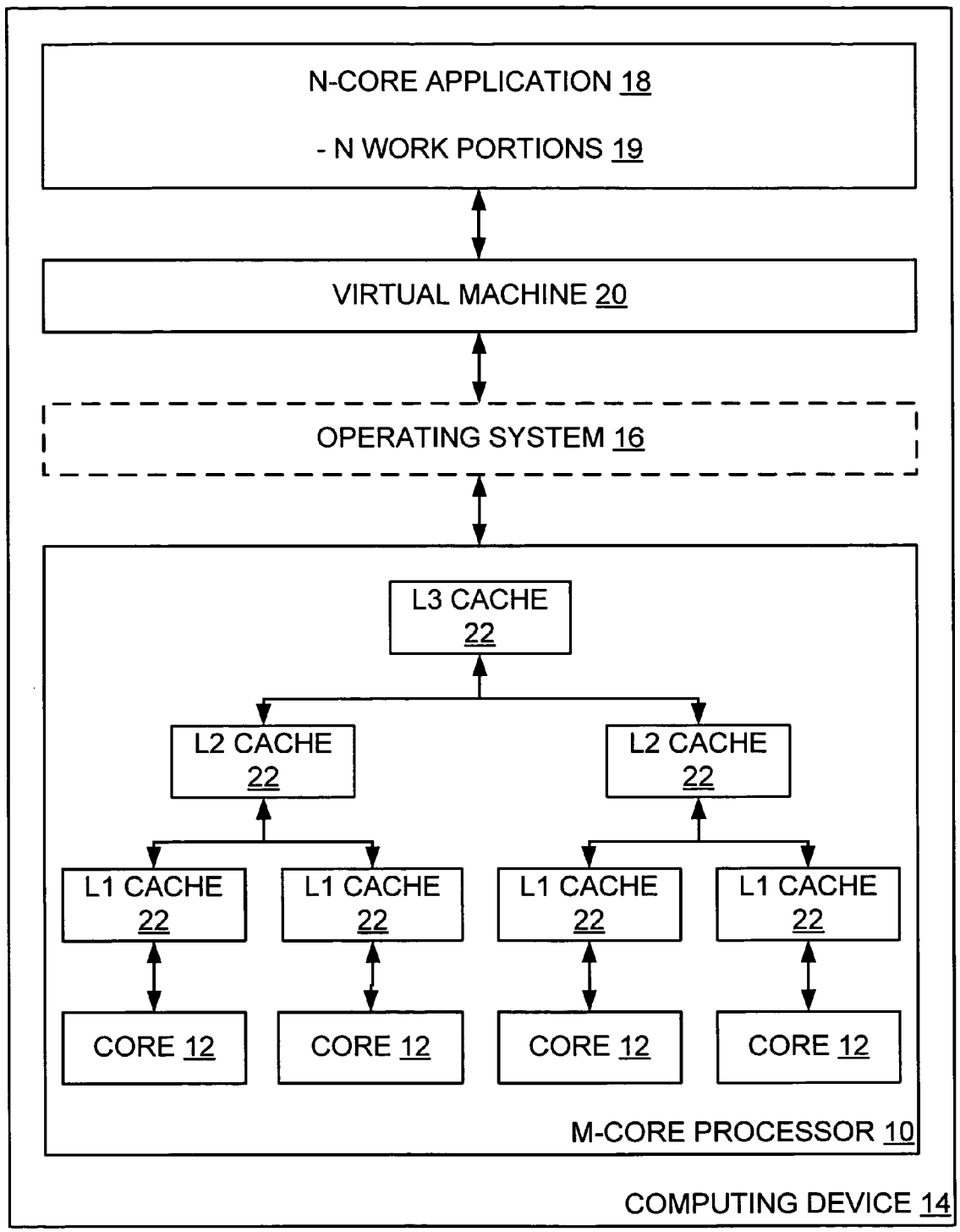
FIGS. 5, 6, and 7 are block diagrams showing the virtual machine of FIG. 4 assigning work portions to the cores of a processor based on interaction (FIG. 5), workload (FIG. 6), and functionality (FIG. 7) in accordance with one embodiment of the present invention.

Notably, and as seen in FIG. 5, a typical multi-core processor 10 organizes the cores 12 to share caches 22 in a hierarchical fashion. In particular, Each core 12 itself has first level (L1) cache 22, pairs of cores 12 share a second level (L2) cache 22, sets of four cores 12 share a third level (L3) cache 22, etc. Accordingly, a pair of cores 12 that share a particular L2 cache 22 can communicate or share with each other in a relatively more efficient manner by way of a corresponding pair of L1 caches 22 and the shared L2 cache 22. Conversely, a pair of cores 12 that do not share a particular L2 cache 22 but that share a particular L3 cache 22 can communicate or share with each other in a relatively less efficient manner by way of the corresponding pair of L1 caches 22, a corresponding pair of L2 caches 22, and the shared L3 cache 22.

Thus, in such a typical multi-core processor 10, if an application 18 includes a pair of work portions 19 that communicate frequently and/or share a relatively large amount of data, such work portions 19 should be assigned to a pair of cores 12 that share an L2 cache 22. Accordingly, in one embodiment of the present invention, the virtual machine 20 as an intermediary between the application 18 and the processor 10 assigns each work portion 19 of the application 18 to a corresponding core 12 of the processor 10 according to an assessment of how much interaction the work portion 19 has with any other work portion.

Thus, and as seen in FIG. 5, a pair of work portions 19 that interact a relatively large amount may be assigned to a pair of cores 12 of the processor 10 that share an L2 cache 22, while a pair of work portions 19 that interact a relatively small amount may be assigned to a pair of cores 12 of the processor 10 that share an L3 cache 22, and a pair of work portions 19 that interact a minimal amount if at all could be assigned to a pair of cores 12 of the processor 10 that share an L4, L5, L6, etc. cache 22 presuming such a cache 22 exists. In any such circumstance, the virtual machine 20 performs such assigning and not the application 18, and thus the application 18 need not be developed with such assigning functionality. Of course, the actual method of assigning work portions 19 according to interaction may be any appropriate method without departing from the spirit and scope of the present invention.

Using the virtual machine 20 as an intermediary between the application 18 and processor 10 can also provide an ancillary yet significant advantage in that the virtual machine 20 may perform dynamic load balancing among the cores 12 of the processor 10. In particular, if an application 18 divides the work thereof into a plurality of work portions 19, the virtual machine 20 may decide to assign a particular work portion 19 to a particular core 12 based on an assessment of the workload of such particular core 12.

Figure 6:
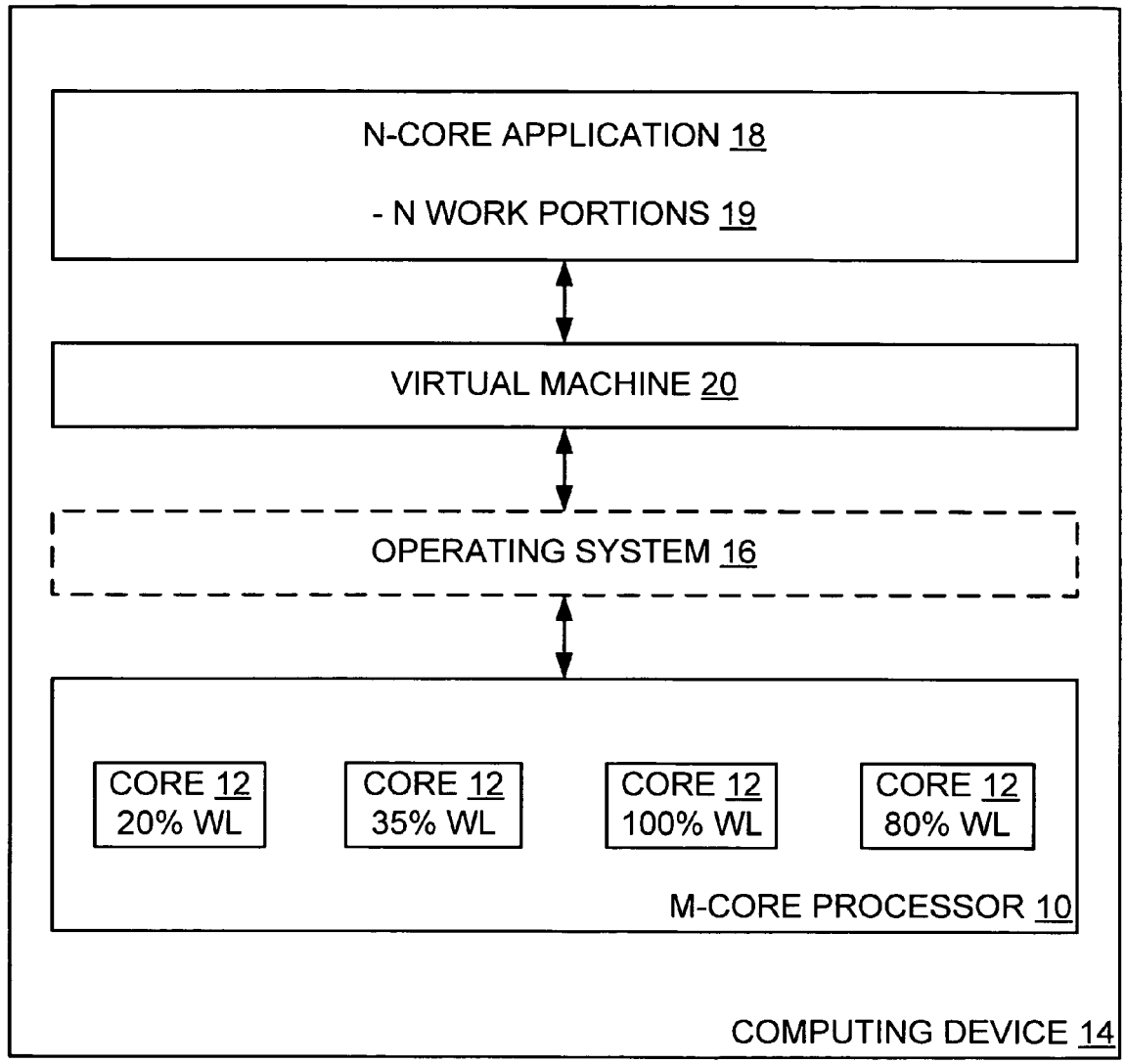

Thus, and as seen in FIG. 6, the virtual machine 20 may assign the particular work portion 19 to a core 12 with a relatively small workload such as the core 12 to the far left with the 20 percent workload (20% WL), as opposed to a core 12 with a relatively large workload such as the core 12 to the far right with the 80 percent workload (80% WL). In addition, the virtual machine 20 may re-assign a particular work portion 19 from a core 12 with a relatively large workload such as the right-middle core 12 with the 100 percent workload (100% WL) to a core 12 with a relatively small workload such as the left-middle core 12 with the 35 percent workload (35% WL). In any such circumstance, the virtual machine 20 performs such load balancing and not the application 18, and thus the application 18 need not be developed with such load balancing functionality. Of course, the actual method of assigning work portions 19 according to workload may be any appropriate method without departing from the spirit and scope of the present invention.

Figure 7:
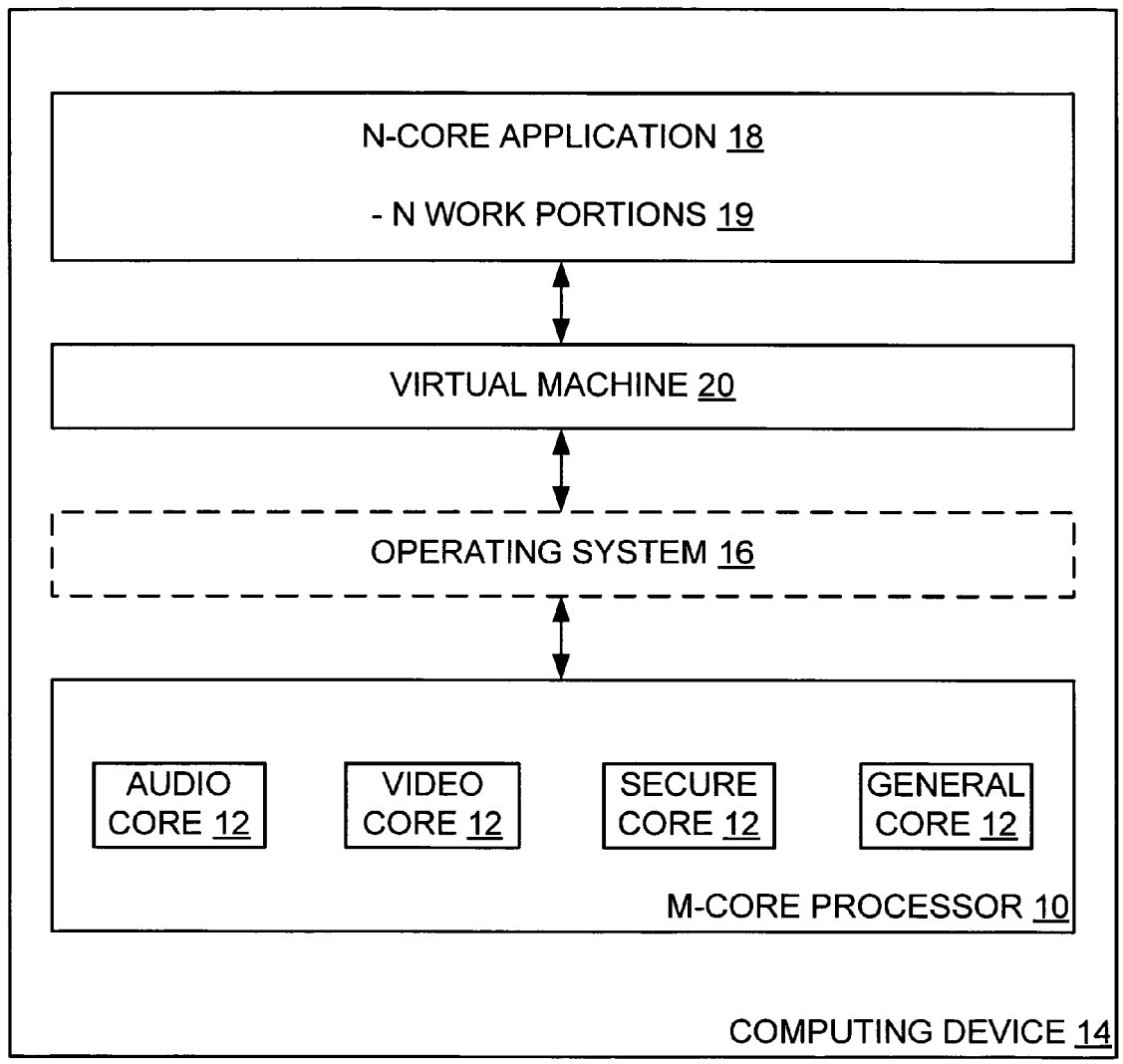

Notably, a particular multi-core processor 10 need not necessarily have identical cores 12. Instead, each core 12 may be of a particular dedicated type. For example, it may be the case that in an 8-core processor 10, 6 of the cores 12 perform general purpose processing, while 1 of the cores performs video-graphic processing and 1 of the cores performs cryptographic processing. Similarly, and as seen in FIG. 7, a 4-core processor 10 may include an audio core 12, a video core 12, a secure core 12, and a general core 12.

With such dedicated type cores 12, then, using the virtual machine 20 as an intermediary between the application 18 and processor 10 can additionally provide an ancillary yet significant advantage in that the virtual machine 20 may perform assignments of work portions 19 according to the type of the work portion 19 and the types of cores 12 available from the processor 10. In particular, if an application 18 has a work portion 19 that requires cryptographic processing, the virtual machine 20 would assign such work portion 19 based on whether the processor 10 has a cryptographic processing core 12, and also based on the workload of such cryptographic core 12. As may be appreciated, if such cryptographic core 12 is present and available, the virtual machine 20 would assign such work portion 19 thereto without further ado. However, if such cryptographic core 12 is present but busy, the virtual machine 20 could assign such work portion 19 thereto, or to another cryptographic core 12, or to a general purpose core 12 with cryptographic software running thereon, all depending on circumstances. Of course, if no cryptographic core 12 is not present, the virtual machine 20 would have to assign such work portion 19 to a general purpose core 12 or the like with cryptographic software running thereon. In any such circumstance, and again, the virtual machine 20 performs such functionality-based assigning and not the application 18, and thus the application 18 need not be developed with such functionality-based assigning capabilities. Of course, the actual method of assigning work portions 19 according to functionality may be any appropriate method without departing from the spirit and scope of the present invention.

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system whereby an N-core application 18 constructed to operate on an N-core processor 10 is in fact operated efficiently on an M-core processor 10, where M is greater than or less than N. The N-core application 18 is operated as if on an N-core processor 10 even though in fact on an M-core processor 10. In particular, the N-core application 18 is operated on a virtual machine 20 that emulates an N-core processor 10, that re-assigns the work of the application 18 to the M-core processor 10 in an efficient manner. Such assigning may be performed based on interaction between work portions 19 of the application 18, based on load balancing considerations, and/or based on functionality required for each work portion 19 of the application 18, among other things.

It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

The invention claimed is:

1. A computing device comprising:
    a multi-core processor having a particular number M of executing cores, each core being a discrete logical processing entity capable of individually being assigned work;
    a multi-core application instantiated on the computing device and expecting a particular number N of executing cores to be present on the M-core processor, where N is not equal to M, the N-core application assigning N application work portions for processing; and
    a virtual machine instantiated on the M-core processor, the N-core application being instantiated on the virtual machine, and the virtual machine emulating an N-core processor to the N-core application for processing of the N application work portions.

2. The computing device of claim 1 wherein each work portion as assigned by the application includes at least one thread.

3. The computing device of claim 1 wherein the virtual machine represents a partitioning of the computing device that isolates the application from other applications on such computing device.

4. The computing device of claim 1 wherein the virtual machine emulates a plurality of differing numbers N of cores of the processor for the application and wherein the virtual machine may be instantiated on any of a plurality of processors, each having a differing number M of cores.

5. The computing device of claim 1 wherein the virtual machine emulates the N cores of the processor for an application and wherein the virtual machine may be instantiated on any of a plurality of processors, each having a differing number M of cores.

6. The computing device of claim 1 wherein the cores of the processor are organized into pairs, each core of each pair of cores being coupled to a level 1 (L1) cache and the L1 caches of each pair of cores being coupled to a shared level 2 (L2) cache such that the pair of cores can communicate data directly therebetween by way of the shared L2 cache, and wherein the virtual machine in assigning a pair of work portions of the application to respective cores of the processor assesses how much interaction exists between the pair of work portions and assigns the pair of work portions based on such assessment, the virtual machine assigning a pair of work portions that interact a relatively large amount to a pair of cores of the processor that share an L2 cache, and assigning a pair of work portions that interact a relatively small amount to cores of the processor that do not share an L2 cache.

7. The computing device of claim 1 wherein the virtual machine in assigning work portions of the application to cores of the processor performs dynamic load balancing among the cores of the processor, the virtual machine assigning each work portion to a particular core based on an assessment of workload of such particular core.

8. The computing device of claim 1 wherein each core of the multi-core processor has a particular type selected from among a plurality of core types, wherein each work portion of the application has a particular type selected from among a plurality of work portion types, and wherein the virtual machine assigns each work portion of the application to a core of the processor according to the type of the work portion and the types of each core available from the processor.

9. The computing device of claim 8 wherein a first core of the processor is a specialized type of core that performs a corresponding specialized task and a second core is a general type of core that performs general tasks, wherein the virtual machine assigns a work portion that corresponds to the specialized task to the first core if such first core is available, and wherein the virtual machine assigns the work portion that corresponds to the specialized task to the second core if such first core is not available, the second core running an emulation for performing the specialized task.

10. A computer-readable medium having stored thereon computer-executable instructions for execution by a computing device having a multi-core processor having a particular number M of executing cores, each core being a discrete logical processing entity capable of individually being assigned work, the computer-executable instructions executed by the computing device comprising:

- a multi-core application instantiated on the computing device for performing a processing function on input data, said multi-core application expecting a particular number N of executing cores to be present on the M-core processor, where N is not equal to M, the N-core application assigning N application work portions for processing the input data using N executing cores; and
- a virtual machine instantiated on the M-core processor, the N-core application being instantiated on the virtual machine, and the virtual machine emulating an N-core processor to the N-core application for processing of the N application work portions.

11. The medium of claim 10 wherein the virtual machine represents a partitioning of the computing device that isolates the application from other applications on the computing device.

12. The medium of claim 10 wherein the virtual machine emulates a plurality of differing numbers N of cores of the processor for the application and wherein the virtual machine may be instantiated on any of a plurality of processors, each having a differing number M of cores.

13. The medium of claim 10 wherein the cores of the processor are organized into pairs, each core of each pair of cores being coupled to a level 1 (L1) cache and the L1 caches of each pair of cores being coupled to a shared level 2 (L2) cache such that the pair of cores can communicate data directly therebetween by way of the shared L2 cache, and wherein the virtual machine in assigning a pair of work portions of the application to respective cores of the processor assesses how much interaction exists between the pair of work portions and assigns the pair of work portions based on such assessment, the virtual machine assigning a pair of work portions that interact a relatively large amount to a pair of cores of the processor that share an L2 cache, and assigning a pair of work portions that interact a relatively small amount to cores of the processor that do not share an L2 cache.

14. The medium of claim 10 wherein the virtual machine in assigning work portions of the application to cores of the processor performs dynamic load balancing among the cores of the processor, the virtual machine assigning each work portion to a particular core based on an assessment of workload of such particular core.

15. The medium of claim 10 wherein each core of the multi-core processor has a particular type selected from among a plurality of core types, wherein each work portion of the application has a particular type selected from among a plurality of work portion types, and wherein the virtual machine assigns each work portion of the application to a core of the processor according to the type of the work portion and the types of each core available from the processor.

16. The medium of claim 15 wherein a first core of the processor is a specialized type of core that performs a corresponding specialized task and a second core is a general type of core that performs general tasks, wherein the virtual machine assigns a work portion that corresponds to the specialized task to the first core if such first core is available, and wherein the virtual machine assigns the work portion that corresponds to the specialized task to the second core if such first core is not available, the second core running an emulation for performing the specialized task.

* * * * *